US012608676B2

(12) United States Patent
Nagaswamy et al.

(10) Patent No.: US 12,608,676 B2
(45) Date of Patent: Apr. 21, 2026

(54) GEOFENCES FOR SHIPPING FACILITIES AND METHODS FOR ESTIMATING MILESTONE EVENTS IN SHIPPING FACILITIES

(71) Applicant: FourKites, Inc., Chicago, IL (US)

(72) Inventors: Sriram Nagaswamy, Chicago, IL (US); Yogeswaran Ganesan, Chicago, IL (US); Ashwin G. Krishnan, Chicago, IL (US); Ajay Hayagreeve, Chicago, IL (US); Mahantesh M. Ambi, Chicago, IL (US)

(73) Assignee: FourKites, Inc., Chicago, IL (US)

( * ) Notice: Subject to any disclaimer, the term of this patent is extended or adjusted under 35 U.S.C. 154(b) by 0 days.

(21) Appl. No.: 18/793,573

(22) Filed: Aug. 2, 2024

(65) Prior Publication Data

US 2025/0053917 A1      Feb. 13, 2025

Related U.S. Application Data

(60) Provisional application No. 63/531,402, filed on Aug. 8, 2023.

(51) Int. Cl.
*G06Q 10/0833* (2023.01)
(52) U.S. Cl.
CPC ................................ *G06Q 10/0833* (2013.01)
(58) Field of Classification Search
CPC ................................................ G06Q 10/0833
See application file for complete search history.

(56) References Cited

U.S. PATENT DOCUMENTS

| | | | |
|---|---|---|---|
| 2017/0046653 A1* | 2/2017 | Wilson | G06Q 10/0838 |
| 2021/0067914 A1* | 3/2021 | Butterwegge | G01S 5/0252 |
| 2021/0081890 A1* | 3/2021 | Atwood | G06Q 10/0838 |
| 2023/0080937 A1* | 3/2023 | Azulai | G08B 21/182 |
| | | | 340/673 |
| 2023/0392933 A1* | 12/2023 | Xiao | G01C 21/203 |
| 2024/0095611 A1* | 3/2024 | Dzugan | G06N 20/20 |

OTHER PUBLICATIONS

Dong-Ping Song, Cargo routing and empty container repositioning in multiple shipping service routes, 2012, p. 1556-1558 (Year: 2012).*

* cited by examiner

*Primary Examiner* — Ibrahim N El-Bathy
(74) *Attorney, Agent, or Firm* — POLSINELLI PC

(57) ABSTRACT

Disclosed are systems, apparatuses, methods, and computer readable medium, and circuits for tracking shipment services. A method includes: obtaining, from a mobile computing device, a shipment information associated with a booking of a load and asset information corresponding to a physical asset associated with transport of the load; identifying one or more sources of location data for the physical asset based on the asset information; and generating tracking information for the load by associating the one or more sources of location data for the physical asset with the shipment information associated with the booking of the load.

17 Claims, 13 Drawing Sheets

100

100

300

600

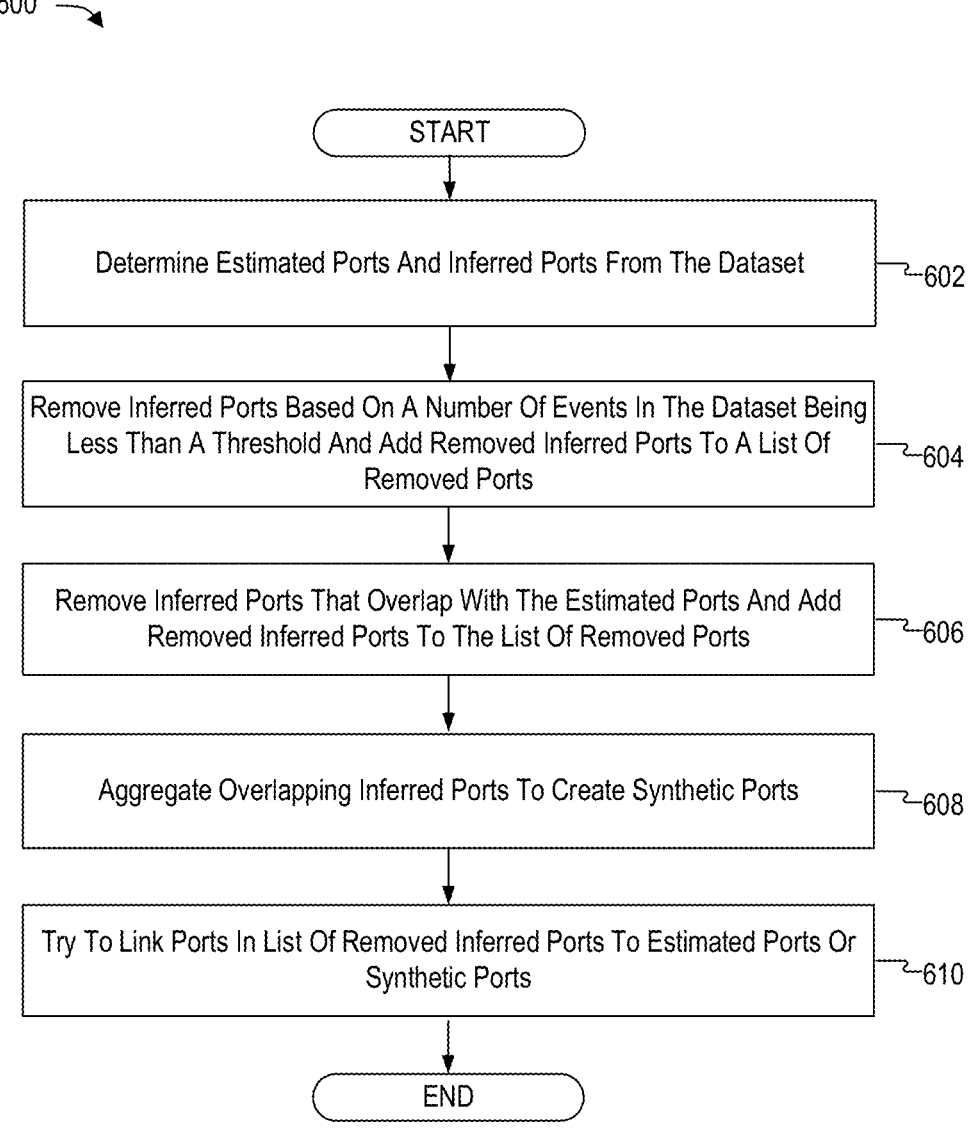

START

Determine Estimated Ports And Inferred Ports From The Dataset — 602

Remove Inferred Ports Based On A Number Of Events In The Dataset Being Less Than A Threshold And Add Removed Inferred Ports To A List Of Removed Ports — 604

Remove Inferred Ports That Overlap With The Estimated Ports And Add Removed Inferred Ports To The List Of Removed Ports — 606

Aggregate Overlapping Inferred Ports To Create Synthetic Ports — 608

Try To Link Ports In List Of Removed Inferred Ports To Estimated Ports Or Synthetic Ports — 610

END

GEOFENCES FOR SHIPPING FACILITIES AND METHODS FOR ESTIMATING MILESTONE EVENTS IN SHIPPING FACILITIES

TECHNICAL FIELD

The present disclosure generally relates to tracking management systems. In some examples, aspects of the present disclosure are related to geofences for shipping facilities and methods for estimating milestone events in shipping facilities.

BACKGROUND

Shippers who import from various suppliers often use pre-defined commercial terms or International Commercial Terms (Incoterms) that instruct the suppliers to make carriage bookings. Unfortunately, in many cases, when a carriage booking is made, the shipper may not have visibility into the shipment or may have partial or incomplete visibility into the shipment. For example, in many cases, the supplier may not provide the booking data to the shipper after making a carriage booking. Without the booking data, the shipper may lack at least some visibility into the shipment. Such incomplete or lack of visibility into the shipment may cause gaps or inaccuracies in the supply chain visibility and/or limit or complicate the shipper's ability to track and/or process certain aspects of the shipment and provide customers with accurate and/or detailed tracking and visibility of the shipment. Moreover, these factors are generally not under the control of the shipper and, as previously explained, may negatively affect the shipper's ability to accurately and/or consistently track shipments and/or provide visibility information.

Carriers may use maritime, aviation, rail, and personal vehicle infrastructure to ship goods based on various requirements. Maritime infrastructure is pivotal to facilitating global trade and transportation, and maritime ports are strategically located harbors that serve as points of entry and exit for ships, allowing the exchange of goods, commodities, and passengers between countries and regions. Similar land-based ports (e.g., rail stations, airports, etc.) are also strategically located to facilitate exchange of goods.

SUMMARY

In some examples, systems and techniques are described for generating geofences for shipping facilities and methods for estimating milestone events in shipping facilities. The systems and techniques may increase visibility of milestone events at various shipping facilities such as a port.

Disclosed are systems, apparatuses, methods, computer readable medium, and circuits for estimating a position of carrier vessels. According to at least one example, a method includes: obtaining location data associated with an Automatic Identification System (AIS) device of a load being shipped to a destination location by a carrier vessel, wherein the location data indicates that the carrier vessel is proximate to one or more ports; providing the location data to a machine learning model, wherein the machine learning model is configured to infer port events, berth events, anchor events, and geofence boundary traversal events of the carrier vessel; and receiving a prediction associated with the load. For example, the apparatus obtains location data associated with an Automatic Identification System (AIS) device of a load being shipped to a destination location by a carrier vessel, wherein the location data indicates that that the carrier vessel is proximate to one or more ports; provides the location data to a machine learning model, wherein the machine learning model is configured to infer port events, berth events, anchor events, and geofence boundary traversal events of the carrier vessel; and receives a prediction associated with the load.

In another example, an apparatus for estimating a position of carrier vessels is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the apparatus to: obtain location data associated with an AIS device of a load being shipped to a destination location by a carrier vessel, wherein the location data indicates that that the carrier vessel is proximate to one or more ports; provide the location data to a machine learning model, wherein the machine learning model is configured to infer port events, berth events, anchor events, and geofence boundary traversal events of the carrier vessel; and receive a prediction associated with the load.

Disclosed are systems, apparatuses, methods, computer readable medium, and circuits for estimating a position of carrier vessels. According to at least one example, a method includes: determining estimated ports and synthetic ports from a dataset associated with shipping one or more loads based on data provided by Automatic Identification System (AIS) devices of the one or more loads; and training a machine learning model based on the estimated ports and the synthetic ports to estimate port events. For example, the apparatus determines estimated ports and synthetic ports from a dataset associated with shipping one or more loads based on data provided by Automatic Identification System (AIS) devices of the one or more loads; and trains a machine learning model based on the estimated ports and the synthetic ports to estimate port events.

In another example, an apparatus for estimating a position of carrier vessels is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the apparatus to: determine estimated ports and synthetic ports from a dataset associated with shipping one or more loads based on data provided by Automatic Identification System (AIS) devices of the one or more loads; and train a machine learning model based on the estimated ports and the synthetic ports to estimate port events.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

In order to describe the manner in which the various advantages and features of the disclosure may be obtained, a more particular description of the principles described herein will be rendered by reference to specific embodiments thereof which are illustrated in the appended drawings. Understanding that these drawings depict only example embodiments of the disclosure and are not to be considered to limit its scope, the principles herein are described and explained with additional specificity and detail through the use of the drawings in which:

FIG. 6 is a flow diagram of a method for estimating and inferring geofences of a port and features of the port in accordance with some aspects of the disclosure;

DETAILED DESCRIPTION

Figure 1:
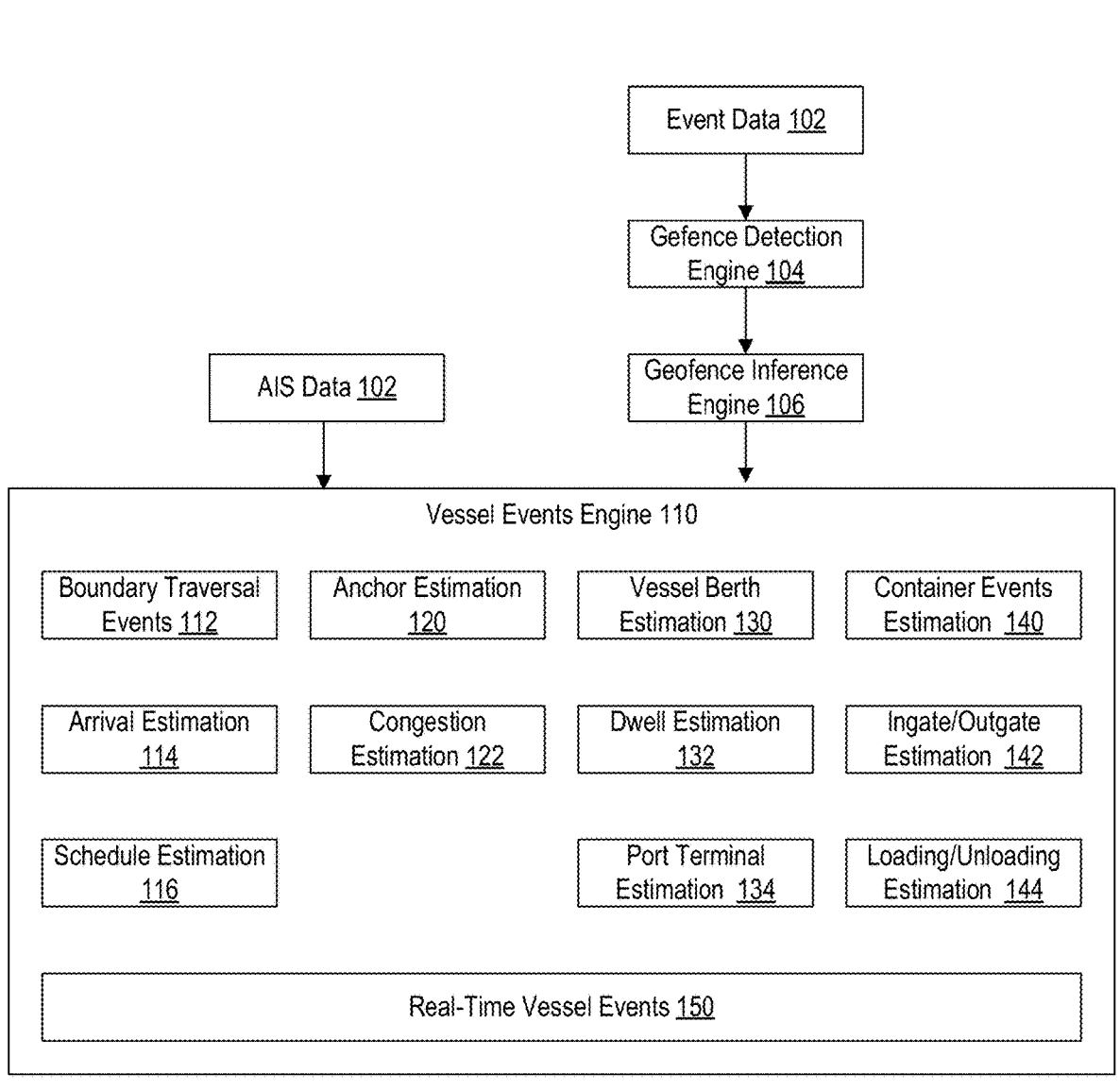
FIG. 1 is conceptual illustration of a vessel estimation service for detecting milestone events in accordance with some aspects of the disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and descriptions are not intended to be restrictive.

The ensuing description provides example aspects only and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

As previously explained, maritime, aviation, and ground-based shipping are critical to global trade and transportation. Milestone events in shipment identify critical stages throughout the transportation process, ensuring the smooth and efficient movement of goods from origin to destination. The first milestone typically involves the initiation of the shipment, where the consignor prepares the goods for transportation and generates the necessary documentation. Next, a load (e.g., goods) is collected and loaded onto the chosen mode of transport, signaling the departure milestone. As the shipment progresses, tracking and monitoring systems provide real-time updates, enabling stakeholders to stay informed about the shipment's status, location, and estimated arrival time. The milestone of customs clearance is vital for international shipments, ensuring compliance with regulations and facilitating smooth passage across borders. Finally, the delivery milestone marks the successful handover of goods to the consignee, completing the shipment process. The milestone events may also vary based on the transportation mode. For example, a vessel participating in a maritime shipment needs to berth at the port before the load may be unloaded into the port.

Events that occur in the various ports cannot be tracked because the lack of quality geofences to identify events, such as a vessel entering the port or berthing at a dock. In particular, there is no standard geofence for any particular port in the world and geofences may be determined using supervised techniques, which is burdensome, or unsupervised techniques, which may be inaccurate. Existing techniques rely on data to infer the geofence and use the inferred geofence to detect the vessel or container arrival and departure. In some cases, geofences may be inaccurate due to insufficient historical at the port. In other cases, the geofences cannot be trusted because proximity to neighboring ports may identify false positive events. For example, overlapping geofences may cause incorrect milestone events to be associated with incorrect ports. For example, ports associated with aviation and other ground-based transit (e.g., rail, automotive, etc.) may be placed near maritime ports.

Milestone events cannot be detected at ports and customers rely on carrier-provided information such as departure time, scans of an items at a location, and so forth. In this case, the milestone events are delayed and events suffer from higher latency before reporting to interested parties. For example, vessel events at a port may be reported several hours after the actual event time.

Systems and techniques are described for estimating a position of carrier vessels. The system and techniques include obtaining location data associated with a load being shipped, providing the location data to a machine learning model, and receiving a prediction associated with the load. In some cases, the machine learning model is configured to infer port events, berth events, anchor events, and geofence boundary traversal events of the carrier vessel. The systems and techniques and estimate different milestone events of the load based on inferences associated the location data to improve visibility of tracking a shipment. The machine learning model may be trained based on data that generates geofence in a standardized manner and improving inferencing.

In one illustrative example, systems and techniques are described for generating geofences associated with a shipping facility. In some aspect, the system and techniques include determining estimated ports and synthetic ports from a dataset associated with shipping one or more loads based on data provided by Automatic Identification System (AIS) devices of the one or more loads and training a machine learning model based on the estimated ports and the synthetic ports to estimate port events. The systems and techniques provide a standardized and consistent method of building geofences, which may be used to train a machine learning model to infer various milestone events that occur within a port, or other shipping facility.

FIG. 1 is conceptual illustration of a vessel estimation service 100 for detecting milestone events in accordance with some aspects of the disclosure. In some aspects, the vessel estimation service 100 includes a vessel estimation engine 110 that receives information to identify milestone events. Non-limiting examples of milestone events include boundary traversal events (e.g., port entry, port exit, etc.), anchor events (e.g., anchor down, anchor up, etc.), berthing events, and container events (e.g., loading of containers or other cargo, unloading of containers or other cargo, etc.).

A boundary traversal event corresponds to ingress or egress into a specified area as identified by at least one geofence. For example, boundary traversal events may occur when a vessel (e.g., a vehicle, a ship, a train, an airplane, etc.) traverses through a boundary to identify the vessel is within the boundary or outside of the boundary. In some cases, multiple boundaries may exist. For example, a port may have a barrier that defines ingress/egress into the port, but may also have different boundaries within the port for berthing, boundaries for terminals (e.g., physical assets for holding cargo), etc. Crossing a boundary is a milestone event that may change the status of the cargo. In some cases, some milestone events may not be detected directly based on data for a location service such as an Automatic Identification System (AIS) device of the vessel or other location tracking device. For example, anchoring of the vessel may be inherently determined based on successful berthing of the vessel by adding an average period of time to deploy the anchor.

The vessel estimation engine 110 may be configured based on event data 102 provided to a geofence detection engine 104. The geofence detection engine 104 may identify estimated geofences based on various types of algorithms. For example, the geofence detection engine 104 may use a clustering algorithm to define a port based on the event data 102. In this case, the geofence detection engine 104 requires a significant amount of information that may be used to identify a tight cluster of data points in the event data 102 and generate, for example, an estimated port that is polygonal. In some cases, the geofence detection engine 104 only uses high density clusters to reduce the possibility of false positives, which may prevent some ports from being detected. For example, a popular maritime port may provide a volume of information because the vessel (e.g., a cargo ship) is anchored at the berthing location for a long period of time. By contrast, cargo at an aviation port may only be berthed for a short period of time, making detection of the port difficult.

In some cases, the event data 102 may be provided to a geofence inference engine 106 that is configured to infer ports. Operation of the geofence inference engine 106 is further described below with reference to FIGS. 4 to 8. In addition, FIGS. 9A-9X are visual illustrations of generating the inferred ports in accordance with some aspects of the disclosure.

The vessel estimation engine 110 is configured to receive AIS data 108 and generate various inferences based on a machine learning (ML) model that is trained using the estimated ports and the inferred ports. In some aspects, the vessel estimation engine 110 may determine one or more boundary traversal events 112, anchor estimations 120, vessel berth estimations 130, and container event estimations 140.

In some aspects, the boundary traversal events 112 relate to a vessel crossing a line to provide a binary determination of the vessel entering or leaving a designed area. In some cases, vessel estimation engine 110 may determine an arrival estimation 114 of the vessel to a boundary of the port. The vessel estimation engine 110 may also determine schedule estimation 116 based on the boundary traversal events 112. For example, the arrival estimation 114 may correspond to the vessel reaching a designated boundary and corresponds to the arrival at a designed port. The schedule information 116 may be an estimated schedule of arrival at another port, such as a destination port.

The anchor estimation 120 may estimate when the vessel may be expected to deploy or retract an anchor prior to docking. For example, the anchor estimations 120 may be able to generate congestion estimations 122 that identify when the vessel may approach the port for berthing or information pertaining to an initial landing approach.

The vessel berth estimations 130 corresponds to times when then vessel is estimated to berth with the port or other features. In some aspects, berthing refers to the process of a vessel safely docking at a designated berth within a port. For example, berthing may be the process of a ship safely docking at a designated berth, or an airplane safely taxiing to a designated berth (e.g., a gate). The vessel berth estimations 130 may also identify a dwell estimations 132, or times that the vessel will be berthed at an estimated berth location. The vessel berth estimations 130 may also provide estimated port terminals 134 associated with load/unloading and storage of the load.

The container event estimations 140 may identify various events associated with the cargo (e.g., load of the vessel). For example, the container event estimations 140 may provide ingate/outgate events. In some aspects, ingate/outgate events are associated with another transport mechanism enters or exits the port. The container event estimations 140 may provide loading/unloading estimations 144 that identify a time of loading events or unloading events.

The vessel estimation engine 110 is configured to infer real-time vessel events 150 based on standardized geofences. For example, the vessel estimation engine 110 may provide real-time estimations of milestone events based on inferences that are determined using the ML model.

Figure 2:
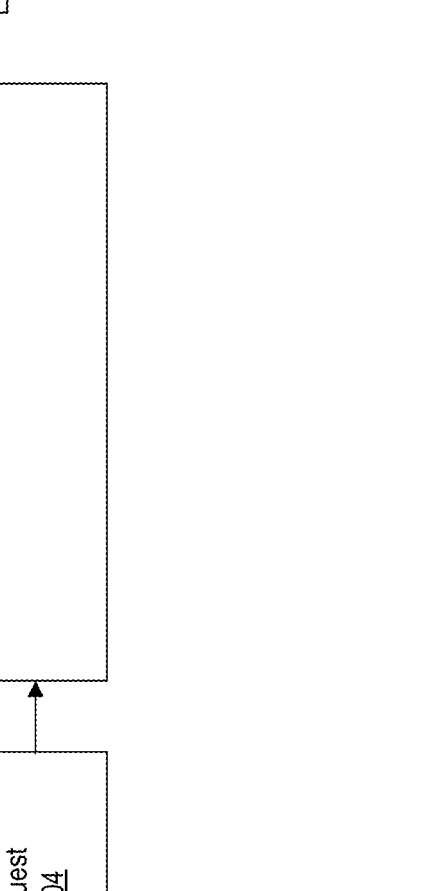
FIG. 2 is a block diagram illustrating an example vessel estimation engine for detecting milestone events at a port in accordance with some aspects of the disclosure.

FIG. 2 is a block diagram illustrating an example vessel events estimation system 200 for detecting milestone events at a port in accordance with some aspects of the disclosure. In some aspects, AIS data 202 from one or more AIS devices and a request 204 may be provided to a vessel event engine 206. In some aspects, the vessel event engine 206 (e.g., the vessel estimation engine 110) is an ML model that is configured to identify various vessel milestone estimations 208. For example, as illustrated in FIG. 1, the vessel event engine 206 may identify boundary traversal events, anchor events, berthing events, and container events.

Figure 3:
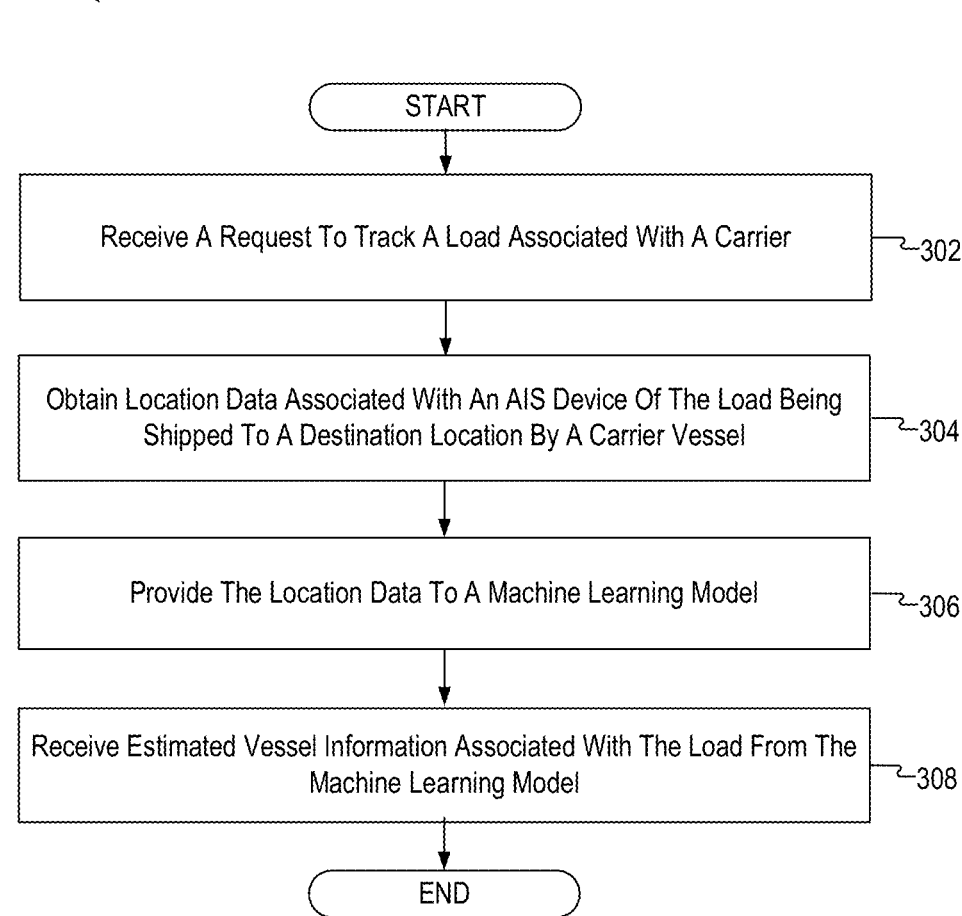
FIG. 3 is a flow diagram of a method for detecting milestone events at a port in accordance with some aspects of the disclosure.

FIG. 3 is a flow diagram of a method 300 for detecting milestone events at a port in accordance with some aspects of the disclosure. In some aspects, the method is performed by a computing device (e.g., the computing device 1000 of FIG. 10). Although the example method 1000 depicts a particular sequence of operations, the sequence may be altered without departing from the scope of the present disclosure. For example, some of the operations depicted may be performed in parallel or in a different sequence that does not materially affect the function of the method 1000. In other examples, different components of an example device or system that implements the method 1000 may perform functions at substantially the same time or in a specific sequence. Although a computing device is described as performing the method, this example is for descriptive purposes. The method may be performed in a distributed manner using cloud computing, various containers, microservices, and other techniques.

At block 302, the computing system may receive a request to track a load associated with a carrier. In this case, a customer may request tracking information pertaining to shipment of a load that was transited using a vessel such as a container ship or an airplane. In this case, the data associated with the shipment may be surfaced using AIS associated with the vessel.

At block 304, the computing device is configured to obtain location data associated with an AIS device (e.g., an AIS device of a container ship) that is being shipped to a destination location by a carrier vessel (e.g., the container ship, airplane, etc.).

At block 306, the computing device may provide the location data of the AIS device to the ML model (e.g., the vessel estimation engine 110, the vessel event engine 206, etc.). The location data may include more than one data point to facilitate identification of various parameters, such as the arrival time (e.g., the determined arrival estimations 114 of FIG. 1) of the AIS device at the destination port.

At block 308, the computing system may receive estimated vessel information associated with the load from the ML model. For example, the ML model may use the location data to identify the arrival time of the carrier vessel at a destination port. Other non-limiting examples of estimated vessel information include boundary traversal events, anchor events, berthing events, and container events. As noted above, boundary traversal events relate to events at a boundary of the port, anchor events relate to delays experienced at the port, berthing events relate to docking events at the port, and container events related to events associated with the container (e.g., the load) with respect to the port.

The method 300 is configured to infer information related to events that are unable to be accurately tracked based on the lack of standardized geofencing at various ports and other shipment facilities. In this case, when a customer requests a status of tracking the load, the method 300 is able to surface information that estimates when events occur. Feedback of information is critical to ensuring supply lines are moving as expected to allow sophisticated customers to plan corresponding business operations and plan contingent plans in the event of unexpected and unforeseen delays.

The ML model (e.g., the vessel estimation engine 110, the vessel event engine 206) in this case is trained based on a geofence detection algorithm (e.g., the geofence detection engine 104) and a geofence inference algorithm (e.g., the/ 106). In some aspects, the geofence detection algorithm and a geofence inference algorithm provide a consistent set of extraction data that allow a machine learning model to build detailed an accurate geofencing for ports. In some aspects, the geofencing may include a geofence for the port, geofences for berthing, and geofences for terminal ports.

Figure 4A:
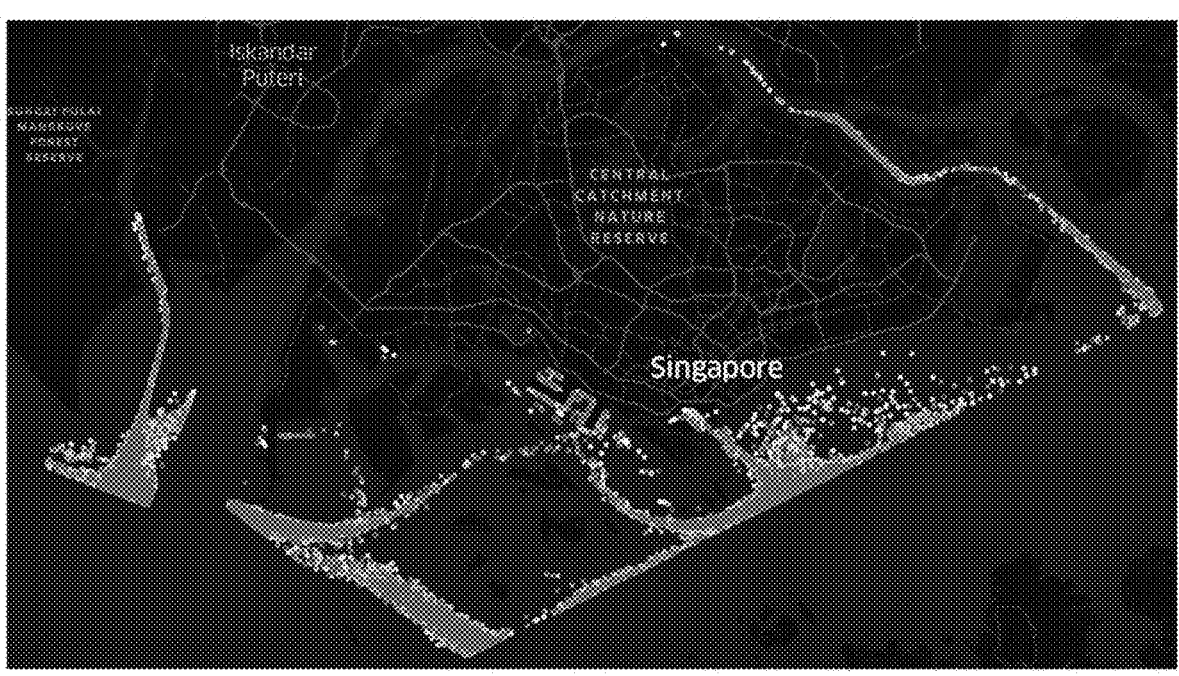
FIGS. 4A-B are illustrations of event data in accordance with some aspects of the disclosure.
Figure 4B:
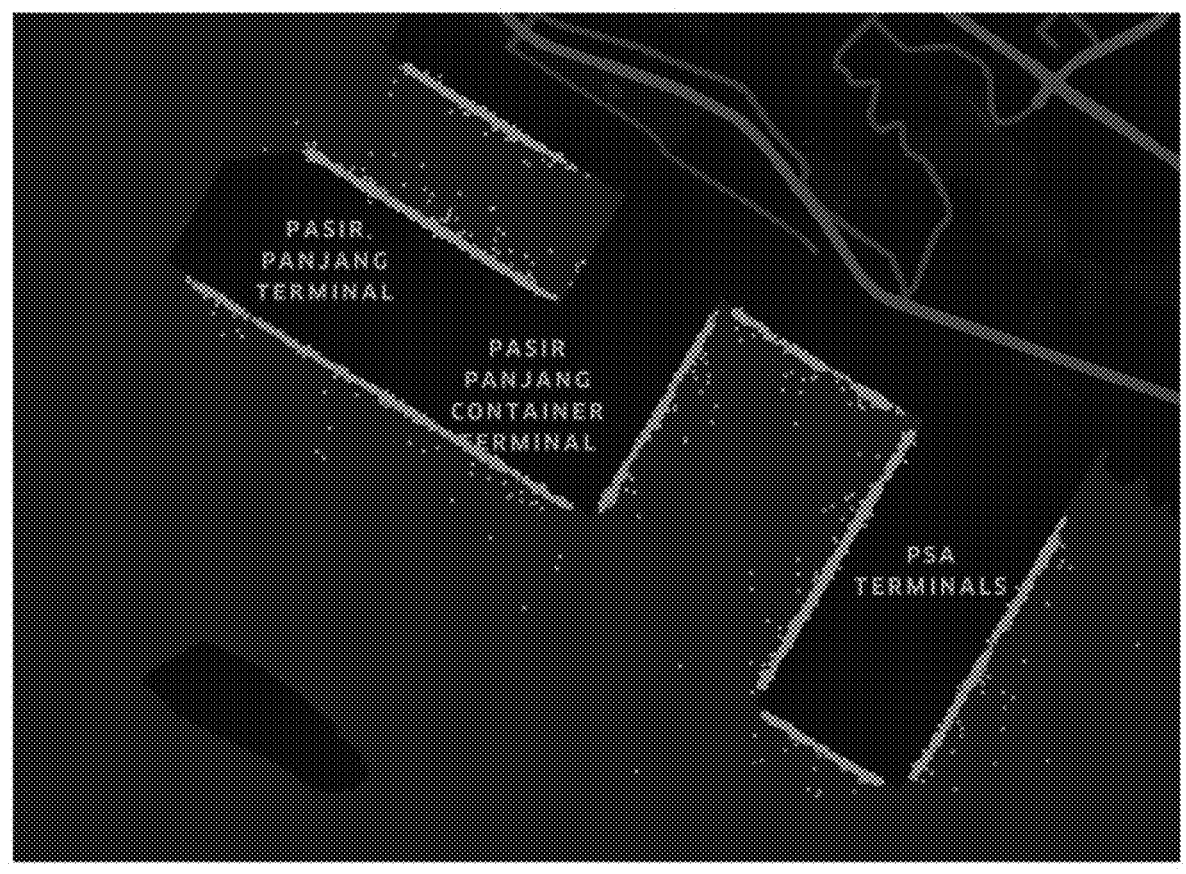

FIGS. 4A-B are illustrations of event data in accordance with some aspects of the disclosure. Referring to FIG. 4A, a port and events associated with a port are illustrated. Each data point is illustrated in FIG. 4A only identifies a position but may also include additional metadata such as a port identifier, which may be specific or partial (e.g., missing at least a portion of information). As shown in FIG. 4A, milestone events associated with a port cannot be identified based on the raw data.

Referring to FIG. 4B, terminals of the port are illustrated and various datapoints of the ports are also shown. Similar to FIG. 4A, milestone events cannot be detected because geofencing associated with the berthing positions is unknown, and some data points illustrate potential movement of the carrier vessel.

Figure 5:
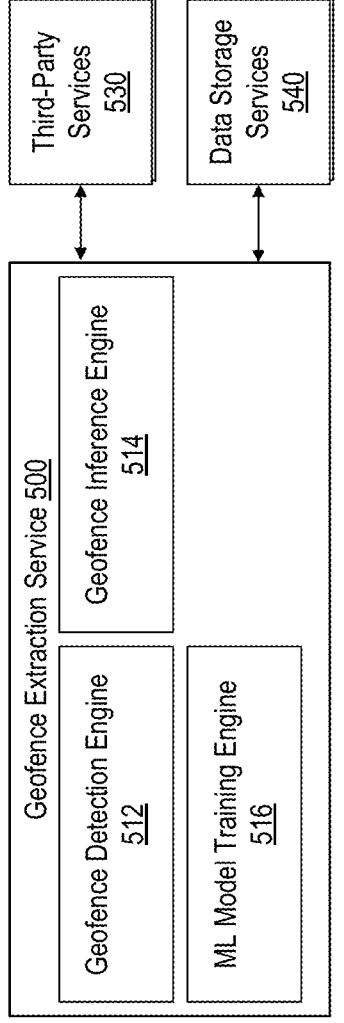
FIG. 5 is a conceptual illustration of a geofence extraction service in accordance with some aspects of the disclosure.

FIG. 5 is a conceptual illustration of a geofence extraction service 500 in accordance with some aspects of the disclosure. In some aspects, the geofence extraction service 500 comprises a geofence detection engine 512, a geofence inference engine 514, and an ML model training engine 516, and the geofence extraction service 500 is configured to interact with third-party services 530 for various content such as AIS data, and data storage services 540 for storing various data, such as an ML model generated by the geofence extraction service 500.

In one aspect, the geofence detection engine 512 is configured to identify estimated geofences of ports based on the AIS data. In some cases, some ports may have a significant volume of data based on a popularity of the port. Due to the volume of the data, the geofence detection engine 512 may implement a clustering algorithm or another detection algorithm to group highly dense data points into a geofence corresponding to a port. In this case, the port is referred to as an estimated port because the geofence detection engine 512 selects dense data points within the data and may be represented by a polygonal boundary. However, as noted above, ports may not have dense data points due to various factors such as vessels that enter and exit the port, etc.

In some cases, the data points may also be inconsistently labeled. For example, the data points may be associated with an identifier such as a unique location code (e.g., unlocode). In some cases, the identifier may be input by a human and shorthand information may be assigned to the data point. The geofence detection engine 512 may identify the shorthand identifier that partially identifies the corresponding port and may ignore the shorthand identifier based on density of the datapoints making it improbable the datapoint is associated with another port.

As noted above, not all ports have sufficient data point density to be identified by the geofence detection engine 512. In this case, the geofence inference engine 514 may be configured to infer a geofence for the port based on a radius associated with the port. For example, the geofence inference engine 514 may identify data points associated with an inferred port, as identified by the identifier corresponding to the inferred port, and determine a centroid associated with that inferred port and a presumed radius (e.g., 3 kilometers). In some cases, the radius may be a fixed value, but in some cases the radius may be based on various numerical techniques, such as a Gaussian distribution. In some aspects, the geofence inference engine 514 is configured to synthesize the inferred ports into synthetic ports that have a boundary.

The geofence inference engine 514 is also configured to remove inferred ports based on one or more conditions (e.g., the inferred port does not intersect a representative port, as described below with reference to FIG. 7) and the removed port may optionally be linked to another port. By linking ports, the geofence extraction service 500 maps data points as best practicable to reduce inferences related to data points that are noisy and would increase training time.

The ML model training engine 516 is configured to use the estimated ports (from the geofence detection engine 512) and the inferred ports (from the geofence inference engine 514) with data events of various ports to train an ML model. In some cases, the ML model training engine 516 is training algorithm for a machine learning (ML) model and iteratively learns geofences of the estimated ports and the inferred ports. Initially, the ML model is initialized with random parameters, and a labeled dataset is provided for training. During each training iteration, the ML model makes predictions on the data, and the resulting output is compared to the true labels using a defined loss function, which quantifies the error. The training algorithm then adjusts the ML model's parameters using optimization techniques like gradient descent with a goal of minimizing the loss and improving predictions. The iterative process is repeated for multiple epochs or until a convergence criterion is met. Through this iterative optimization, the ML model gradually learns patterns and features in the data, enabling it to make more accurate predictions on new, unseen examples.

The ML model training engine 516 may be implemented with various frameworks for training ML models. Non-limiting examples of frameworks include TensorFlow, PyTorch, Keras, scikit-learn, Caffe, MXNet, Microsoft Cognitive Toolkit (CNTK), Theano, Thinc, and Deeplearing4j. In this case, the ML model training engine 516 is configured to build maps or other data to identify the various geofences associated with a port using standardized techniques.

FIG. 6 is a flow diagram of a method 600 for estimating and inferring the geofences of a port and features of the port in accordance with some aspects of the disclosure. In some aspects, the method 600 is configured to identify the estimated ports and the inferred ports prior to training the ML model.

At block 602, the computing system is configured to determine estimated ports and inferred ports from the dataset. For example, as described above, the estimated ports may be determined based on a density due to high volume of data points of the port. Non-limiting technique to identify the estimated port includes a clustering algorithm, a K-means algorithm, density clustering, distribution clustering, Gaussian mixture, balance iterative reducing and clustering using hierarchies (BIRCH), affinity propagation, means-shift, ordering points to identify the clustering structure (OPTIC), spectral, etc. Inferred ports may be identified based on data points not deemed within the estimated ports using a different algorithm, such as a centroid-based clustering algorithm, identifiers associated with the data points that indicate a destination port, etc.

At block 604, the computing system is configured to remove inferred ports based on a number of events in the dataset being less than a threshold. For example, if an inferred port has 10 data points or less from the events history (or dataset), the inferred port is removed from the inferred ports list. Ports removed from the inferred ports are added to a removed ports list, which will be linked to another port if possible. Linking the ports is preferred because training will converge faster.

At block 606, the computing system is configured to remove inferred ports that overlap with the estimated ports. In some cases, the computing system may determine an area associated with the overlap to determine if the overlap is sufficient. A de minimis overlap is presumed to be a different port, but inferred ports that have enough overlap with the estimated ports are presumed to have noisy data and may be incorporated into the estimated port. Removed ports at block 608 may not be added to removed ports list. The removed ports list is presumed to be noisy or spurious data points and the linking assists with mapping corresponding noisy or spurious data to the correct port.

At block 608, the computing system is configured to aggregate overlapping inferred ports into a synthetic port. For example, two inferred ports that overlap are merged into a single shape using a convex hull operation or similar geometric operation. An illustrative example of block 608 is further described with reference to FIG. 7.

At block 610, the computing system is configured to try to link ports in the removed ports list to estimated ports or synthetic ports. As noted above, the removed ports list is presumed to be noisy or spurious data points and the linking assists with mapping corresponding noisy or spurious data to the correct port. In some cases, the datapoints may not be linked to another corresponding point and this datapoint is presumed noisy and cannot be used in the training operations. An illustrative example of block 610 is further described with reference to FIG. 8.

The method 600 identifies and aligns data (e.g., the/102) in connection with ML model training to reduce training time and improve inferences. Notably, more training of an ML model does not guarantee better performance, but improving input, such as providing a high-quality identification of ports, does improve ML model performance. In this case, the ML model may identify different geofences associated with the estimated ports and the synthetic ports.

Figure 7:
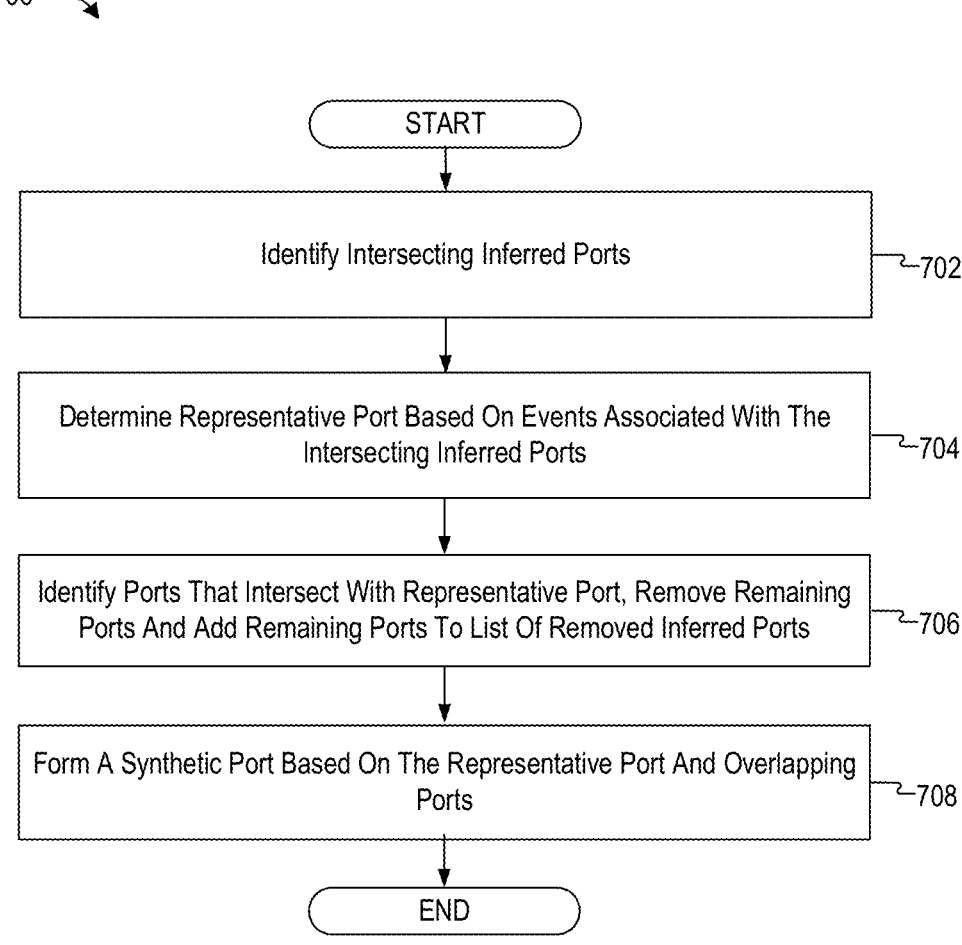
FIG. 7 is a flow diagram of a method for aggregating inferred ports in accordance with some aspects of the disclosure.

FIG. 7 is a flow diagram of a method 700 for aggregating inferred ports in accordance with some aspects of the disclosure. In some cases, the method 700 may be at least a part of block 608 of FIG. 8.

At block 702, the computing system may identify intersecting inferred ports. Reference to example. In some cases, the intersection of the inferred ports may also need to meet a threshold area of overlap of at least one inferred port to be deemed to intersect. In this case, the threshold is to ensure that inferred ports having a de minimis amount of overlap do not join different inferred ports that are different.

In some aspects, blocks 704 to 708 are performed for each group of intersecting ports and for each operation is omitted for purposes of clarity.

At block 704, the computing system may determine a representative port within a group of intersecting ports based on events within the group of intersecting ports. For example, an inferred port with a score calculated based on a number of events and density may be the representative port.

At block 706, the computing system may identify ports that intersect with the representative port and remove remaining ports. In some aspects, the remaining ports may be added to the list of removed ports. In other cases, additional inferred port groups may be generated and then appended to the group of intersecting ports. In other cases, different factors may be used to determine whether ports are maintained within the group, such as event density, number of events, centroid biasing of the events in the group, etc.

At block 708, the computing system may form a synthetic port based on the representative port and the remaining overlapping ports. For example, a single shape is generated by taking a union of the representative port and the remaining inferred ports. In some cases, a convex hull operation may be performed to combine the ports into the synthetic port.

Figure 8:
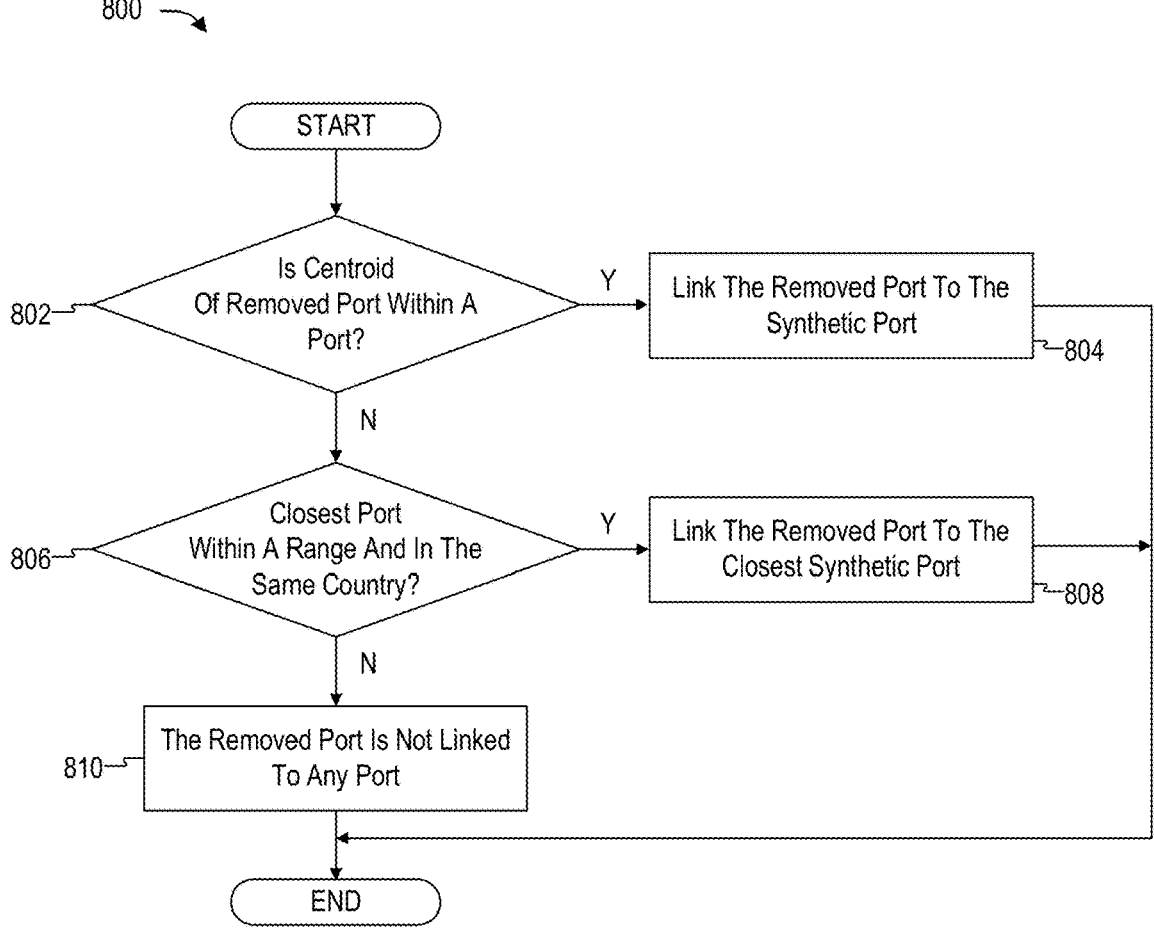
FIG. 8 is a flow diagram of a method for linking ports in list of removed inferred ports to estimated ports or synthetic ports in accordance with some aspects of the disclosure.
Figure 9A:
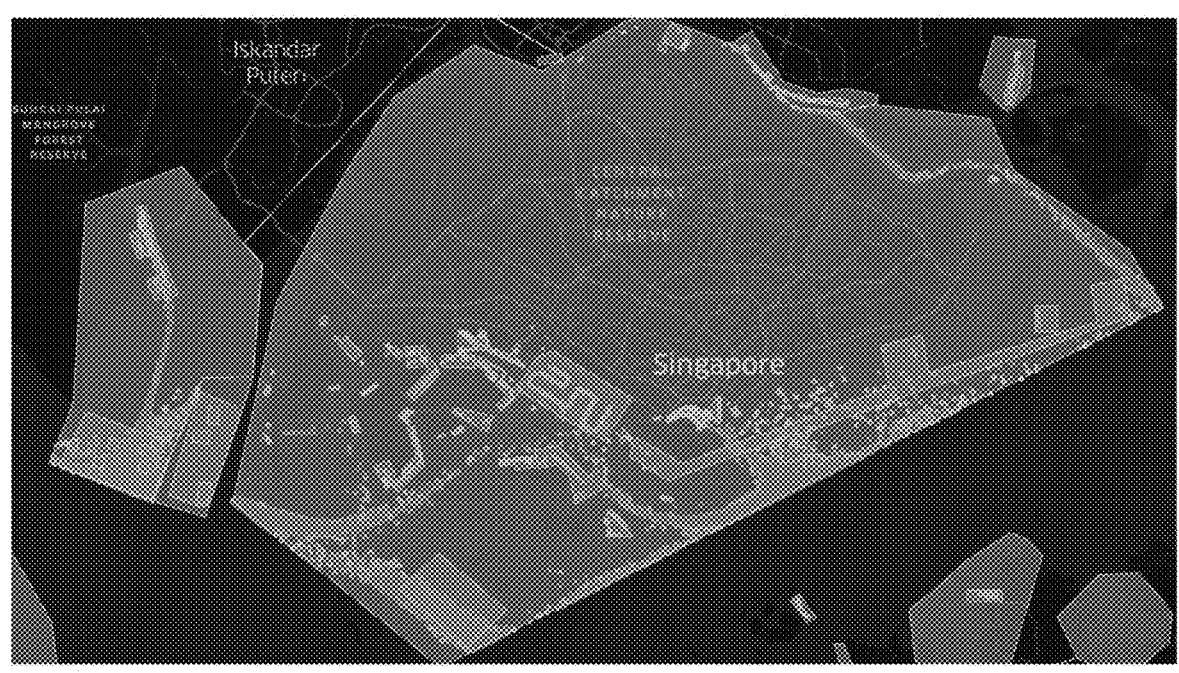
FIGS. 9A-9G are various illustrations illustrating various aspects of the disclosure.

FIG. 8 is a flow diagram of a method 800 for linking ports in list of removed inferred ports to estimated ports or synthetic ports in accordance with some aspects of the disclosure. In some aspects, each removed port in the list of removed ports is subject to the method 800 to identify spurious or noisy data that aligns a synthetic port or an estimated port. To the extent that the data point may be linked to a synthetic port or an estimated port, the link may resolve a training iteration on a data faster and improve the model quality.

At block 802, the computing system executing the method 800 may determine if a centroid of a removed port is within a synthetic port or an estimated port. In this case, the synthetic ports and the estimated ports cannot overlap based on the operations described above. If the centroid is within the synthetic port or the estimated port, the computing system proceeds to block 804, otherwise the computing system proceeds to block 806.

At block 804, the computing system links the removed port to the synthetic port of the estimated port. In this case, when noisy or otherwise spurious data is detected and is similar to the removed port, the ML training engine may infer that the spurious or noisy data converge on the linked synthetic or estimated port.

At block 806, the computing system may identify if a closest port is within a fixed range (e.g., 50 kilometers) of the removed port and if the closest port is in the same country. If the closest port is within the fixed range and in the same country, the computing system proceeds to block 808, otherwise, the computing system proceeds to block 810.

At block 808, the computing system links the removed port the closest synthetic ports and the estimated ports within the same country. Similar to block 804, the goal is to use all data if possible by inferring relations where possible.

At block 810, the computing system does not link the removed port to any other port. In this case, the data point is removed.

Figure 9B:
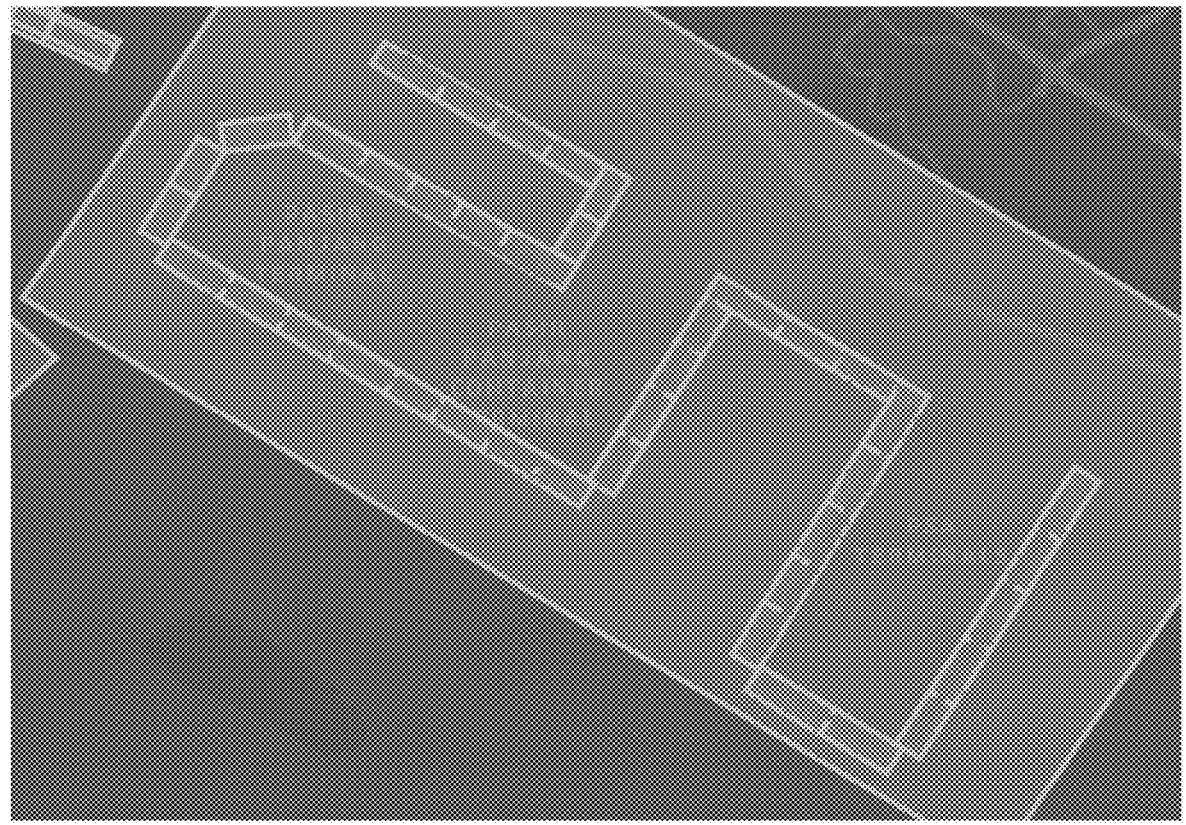

FIGS. 9A-9G are various illustrations illustrating various aspects of the disclosure. FIG. 9A illustrates geofences that are constructed based on the raw data illustrated in FIG. 4A. In this case, various geofences of a port may be generated. FIG. 9B further illustrates a geofence of a port of various terminals and a geofences associated with berthing locations in the various terminals based on the raw data illustrated in FIG. 4B. In this case, milestone events may be detected based on location data that is identified within the geofence.

Figure 9C:
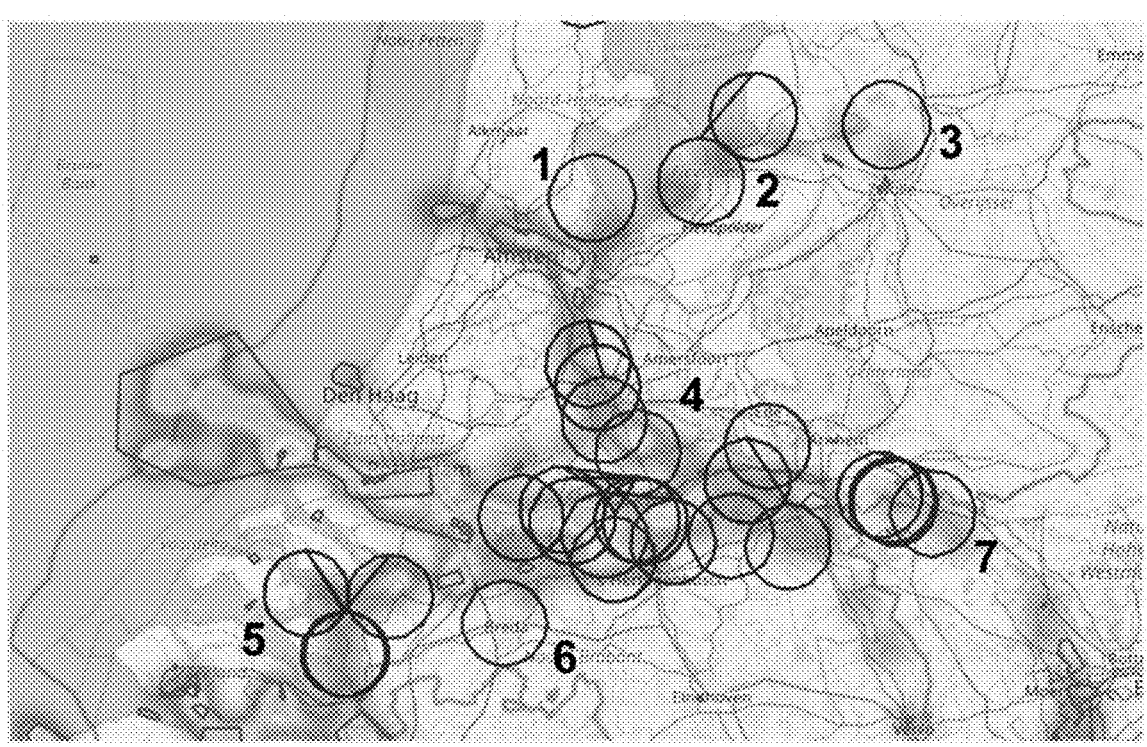

FIG. 9C illustrates an example of estimated ports and inferred ports. In this case, a polygonal shape corresponds to an estimated port and the circular shapes correspond to an inferred port. In this example, inferred ports may have been removed and only groups of ports are illustrated. In this case, seven different groups or inferred ports are detected and may be converted into synthetic ports.

Figure 9D:
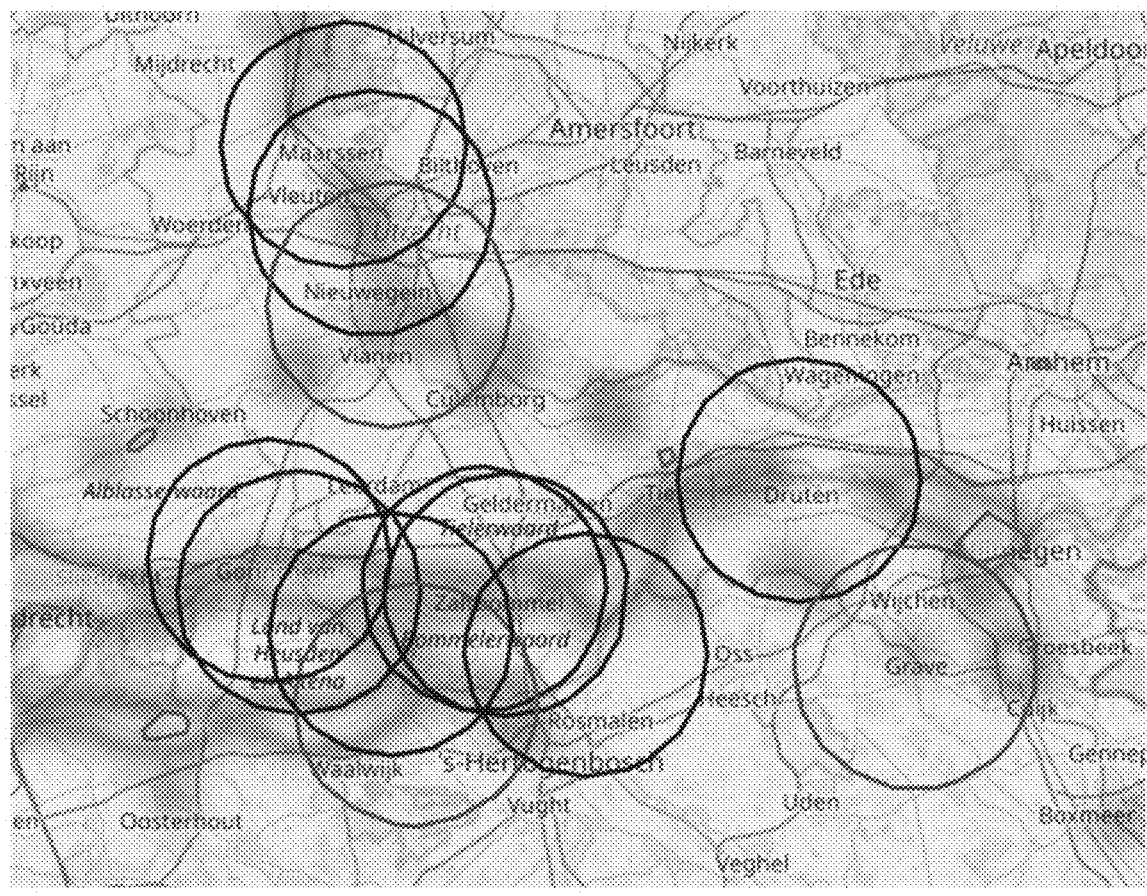
Figure 9E:
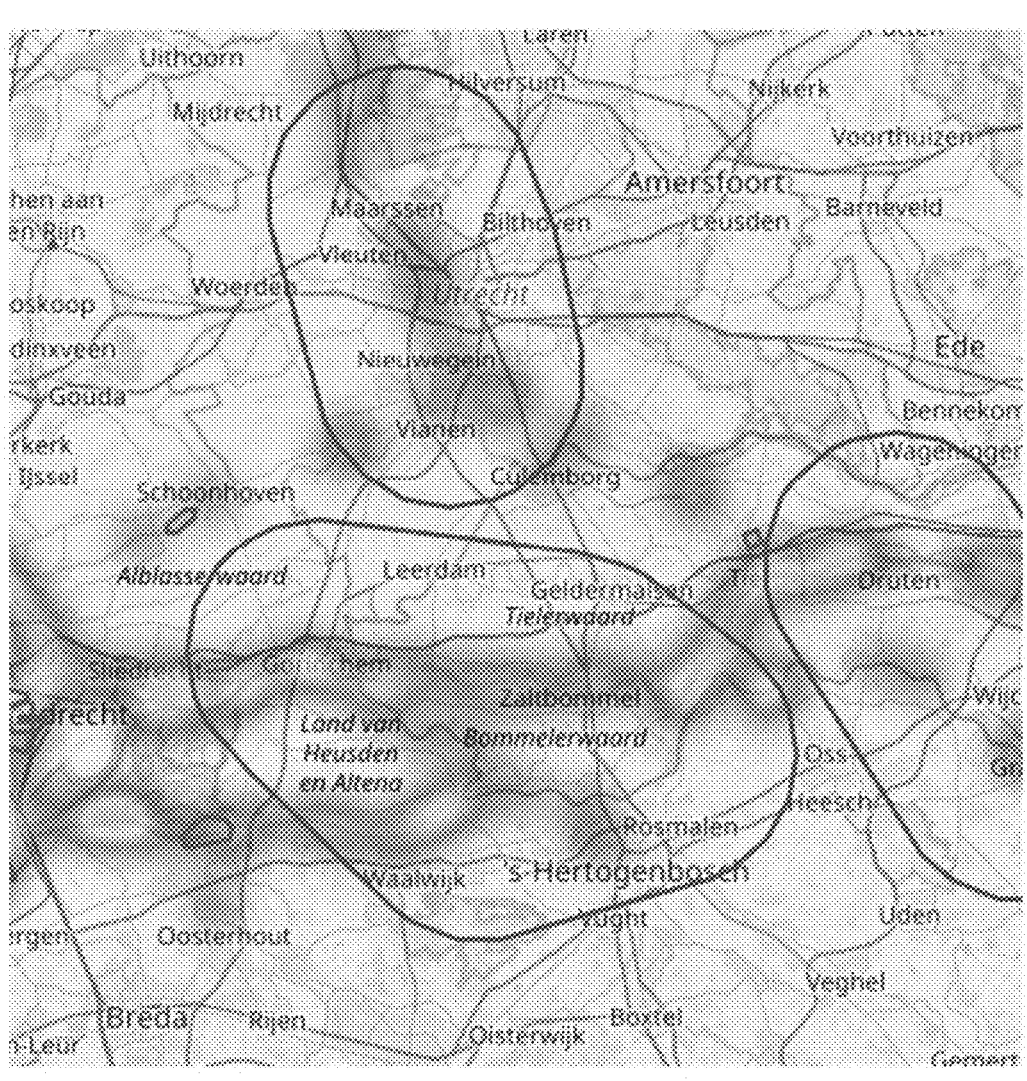
Figure 9F:
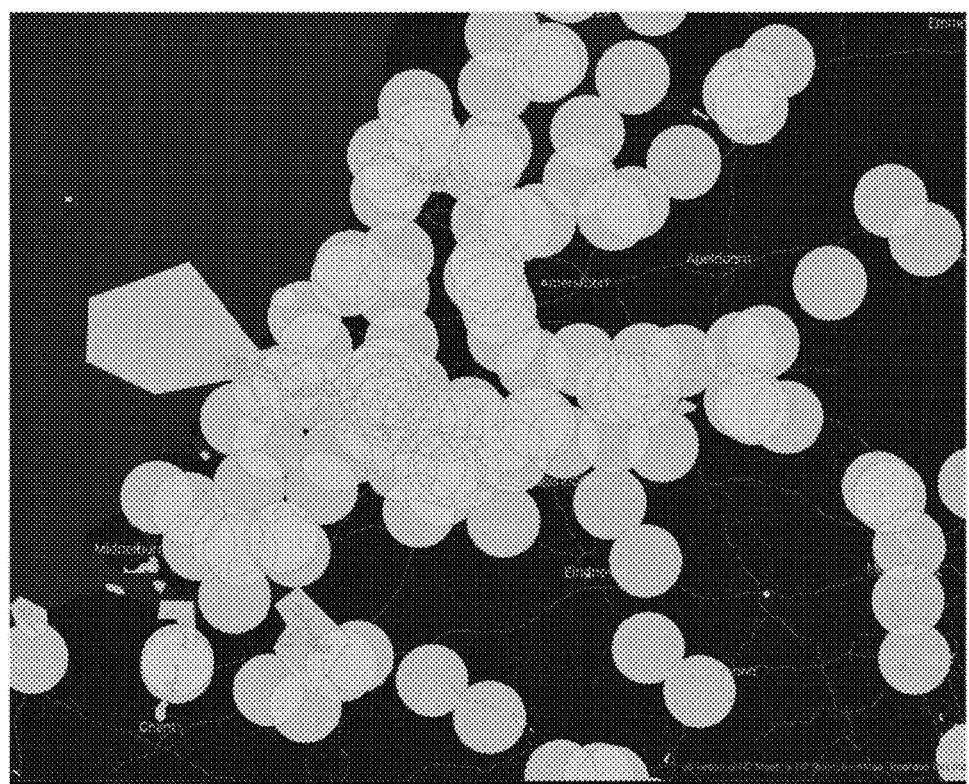
Figure 9G:
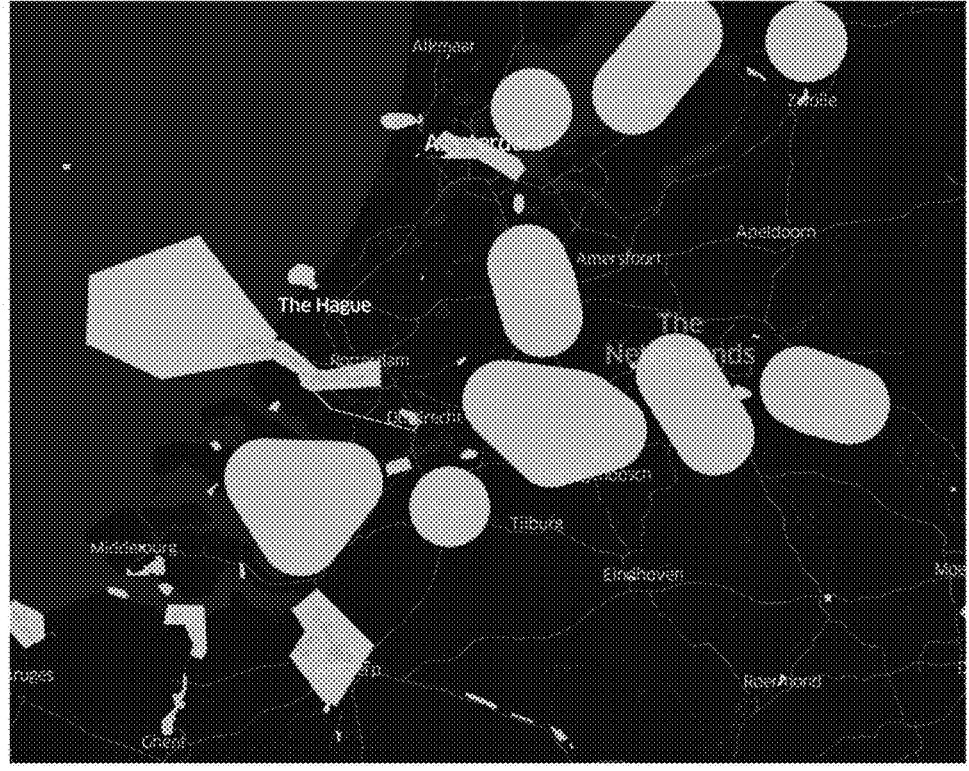

FIG. 9D illustrates an example of three inferred port groups. FIG. 9E illustrates the three inferred port groups that are converted into individual synthetic ports. FIG. 9F illustrates another example of inferred ports and estimated groups prior to processing, and FIG. 9G illustrates the final estimated and synthetic ports shown in FIG. 9F after processing.

Figure 10:
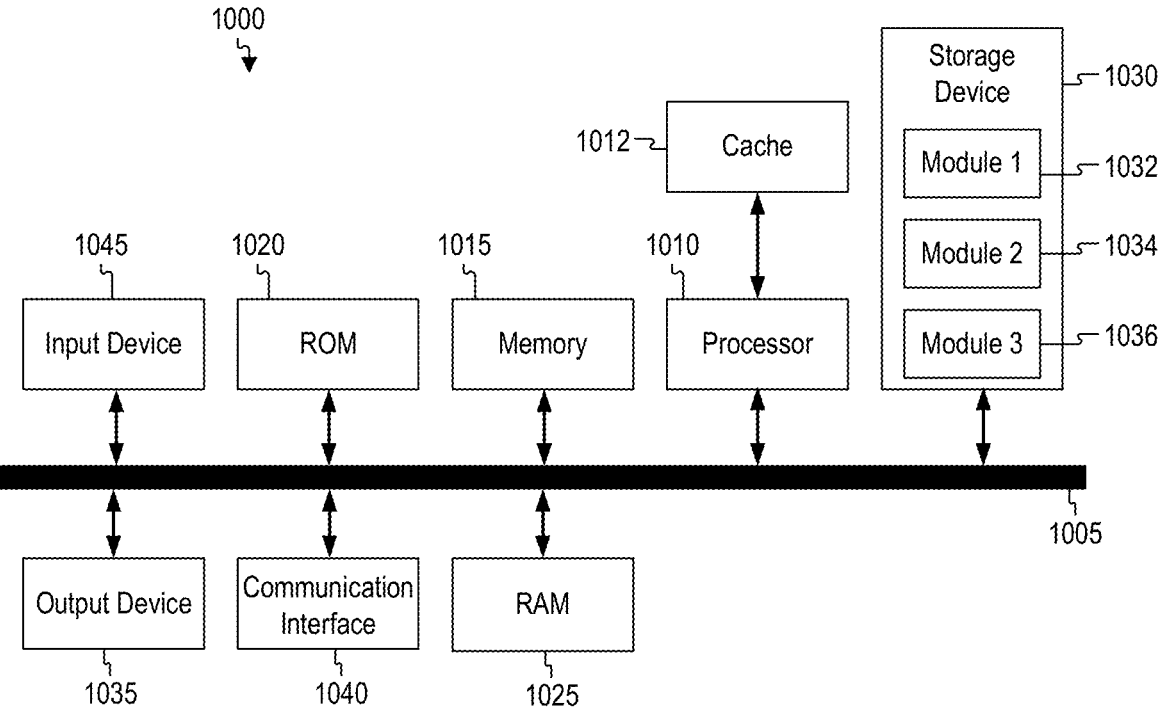
FIG. 10 illustrates an example computing device architecture, in accordance with some examples of the present disclosure.

FIG. 10 is a diagram illustrating an example of a system for implementing certain aspects of the present technology. In particular, FIG. 10 illustrates an example of computing system 1000, which may be for example any computing device making up an internal computing system, a remote computing system, a camera, or any component thereof in which the components of the system are in communication with each other using connection 1005. In some cases, the connection 1005 may be a physical connection using a bus, or a direct connection into processor 1010, such as in a chipset architecture. The connection 1005 may also be a virtual connection, networked connection, or logical connection.

In some aspects, computing system 1000 is a distributed system in which the functions described in this disclosure may be distributed within a data center, multiple data centers, a peer network, etc. In some aspects, one or more of the described system components represents many such components each performing some or all of the function for which the component is described. In some aspects, the components may be physical or virtual devices.

The example computing system 1000 includes at least one processor 1010 (e.g., a CPU or processor unit) and connection 1005 that couples various system components including system memory 1015, such as ROM 1020 and RAM 1025 to processor 1010. The computing system 1000 may include a cache 1012 of high-speed memory connected directly with, in close proximity to, or integrated as part of the processor 1010.

The processor 1010 may include any general purpose processor and a hardware service or software service, such as services 1032, 1034, and 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction, the computing system 1000 includes an input device 1045, which may represent any number of input mechanisms, such as a microphone for speech, a touch-sensitive screen for gesture or graphical input, keyboard, mouse, motion input, speech, etc. The computing system 1000 may also include output device 1035, which may be one or more of a number of output mechanisms. In some instances, multimodal systems may enable a user to provide multiple types of input/output to communicate with computing system 1000. The computing system 1000 may include communications interface 1040, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The storage device 1030 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a Blu-ray® disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1030 may include software services, servers, services, etc., that when the code that defines such software is executed by the processor 1010, it causes the system to perform a function. In some aspects, a hardware service that performs a particular function may include the software component stored in a computer-readable medium in connection with the necessary hardware components, such as processor 1010, connection 1005, output device 1035, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the Wi-Fi (802.11x) standards, data according to the Bluetooth™ standard, data according to the IP standard, and/or other types of data.

The components of the computing device may be implemented in circuitry. For example, the components may include and/or may be implemented using electronic circuits or other electronic hardware, which may include one or more programmable electronic circuits (e.g., microprocessors, GPUs, DSPs, CPUs, and/or other suitable electronic circuits), and/or may include and/or be implemented using computer software, firmware, or any combination thereof, to perform the various operations described herein.

In some aspects the computer-readable storage devices, mediums, and memories may include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but may have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures may include hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices, or other small form factor personal computers, personal digital assistants, rackmount devices, standalone devices, and so on. The functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as RAM such as synchronous dynamic random access memory (SDRAM), ROM, non-volatile random access memory (NVRAM), EEPROM, flash memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more DSPs, general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method for estimating a position of carrier vessels, comprising:

obtaining location data associated with an Automatic Identification System (AIS) device of a load being shipped to a destination location by a carrier vessel, wherein the location data indicates that the carrier vessel is proximate to one or more ports;

providing the location data to a trained machine learning model, wherein the machine learning model is configured to infer port events, berth events, anchor events, and geofence boundary traversal events of the carrier vessel based on the synthetic port dataset; and receiving a prediction associated with the load, wherein the trained machine learning model is trained by a training algorithm that iteratively learns a geofence dataset comprising estimated ports generated from high-density clusters of AIS data and synthetic ports generated by aggregating overlapping inferred ports derived from sparse AIS data and adjusts one or more parameters of the trained machine learning model based on the geofence dataset, wherein the synthetic ports are formed by geometrically merging inferred ports using centroid and radius-based inference and a convex hull or union operation to define a unified port boundary, wherein inferred ports having fewer than a threshold number of AIS data points are removed and selectively linked to one of the estimated ports or synthetic ports based on spatial containment, boundary overlap, or proximity within a predetermined distance range, and wherein the geofence dataset is configured to reduce label noise and improve convergence and inference accuracy of the trained machine learning model for detecting the port events, berth events, anchor events, and geofence boundary traversal events.

2. The method of claim 1, wherein the prediction identifies a target port of the one or more ports.

3. The method of claim 2, wherein the prediction comprises an estimated time of arrival of a vehicle carrying the load at a next port.

4. The method of claim 2, wherein the prediction comprises an estimated time of loading the load, unloading the load, an ingate, or an outgate.

5. The method of claim 2, wherein the prediction comprises a dwell time of a vehicle at the target port.

6. The method of claim 2, wherein the prediction comprises a congestion delay that the carrier vessel will experience at the target port.

7. The method of claim 2, wherein the prediction comprises an identity of a terminal for berthing of the carrier vehicle-vessel at the target port.

8. The method of claim 2, wherein the prediction comprises an estimated sailing schedule of the carrier vessel.

9. A method of generating geofences associated with a shipping facility, comprising:

iteratively learning, using a training algorithm, a geofence dataset comprising estimated ports generated from high-density clusters of Automatic Identification System (AIS) data and synthetic ports generated by aggregating overlapping inferred ports derived from sparse AIS data, wherein the synthetic ports are formed by geometrically merging inferred ports using centroid and radius-based inference and a convex hull or union operation to define a unified port boundary, wherein inferred ports having fewer than a threshold number of AIS data points are removed and selectively linked to one of the estimated ports or synthetic ports based on spatial containment, boundary overlap, or proximity within a predetermined distance range, and wherein the geofence dataset is configured to reduce label noise and improve convergence and inference accuracy of the machine learning model for detecting the port events, berth events, anchor events, and geofence boundary traversal events; and training, using the training algorithm, a machine learning model based on the estimated ports and the synthetic ports of the geofence dataset to estimate port events, berth events, anchor events, and geofence boundary traversal events of a carrier vessel.

10. The method of claim 9, wherein determining the estimated ports from the dataset comprises:

identifying a list of estimated ports from the dataset, wherein each estimated port in the list of estimated ports is associated with a geofence containing event histories of the estimated ports; and identifying a list of inferred ports based on the dataset, wherein each inferred port in the list of inferred ports are associated with an estimated geofence based on a centroid.

11. The method of claim 10, wherein identifying the estimated ports is based on an algorithm to identify a geofence of a known port based on the dataset.

12. The method of claim 10, comprising:

creating a list of removed ports that are removed from the list of inferred ports based on a selection process; and generating a synthetic port based on a representative port based on candidate ports that are not selected based on the selection process.

13. The method of claim 12, wherein the selection process comprises:

identifying the representative port based on events in the dataset; and identifying the candidate ports based on intersection of the candidate ports with the representative port, wherein remaining ports of the list of inferred ports that do not intersect with the representative port are added to the list of removed ports.

14. The method of claim 13, wherein generating the synthetic port comprises merging the representative port and the candidate ports to yield the synthetic port into shape having a boundary.

15. The method of claim 12, further comprising linking at least a portion of ports in the list of removed ports to a neighbor synthetic port.

16. The method of claim 15, wherein linking a first port in the list of removed ports comprises:

when a centroid of the first port is located with a boundary of the neighbor synthetic port, linking the first port to the neighbor synthetic port; or when the first port is located within a range of the neighbor synthetic port and both the first port and the neighbor synthetic port are located in a single country, linking the first port to the synthetic port, wherein the first port is not linked to any synthetic port when the first port is not located within a range of the neighbor synthetic port or the first port and the neighbor synthetic port are not located in the single country.

17. The method of claim 9, wherein each synthetic port comprises at least one of a boundary geofence, geofences associated with berthing, and geofences associated with terminals.

* * * * *